(12) United States Patent
Sheehan

(10) Patent No.: US 8,862,590 B2
(45) Date of Patent: Oct. 14, 2014

(54) FLEXIBLE NAMESPACE PRIORITIZATION

(75) Inventor: John M. Sheehan, Somerville, MA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 11/771,964

(22) Filed: Jun. 29, 2007

(65) Prior Publication Data
US 2009/0007162 A1 Jan. 1, 2009

(51) Int. Cl.
*G06F 17/30* (2006.01)
*G06F 9/50* (2006.01)
*G06F 7/00* (2006.01)

(52) U.S. Cl.
CPC .................. *G06F 9/5005* (2013.01); *G06F 17/301* (2013.01)
USPC ............ 707/748; 707/728; 707/769; 707/821

(58) Field of Classification Search
None
See application file for complete search history.

(56) References Cited

U.S. PATENT DOCUMENTS

| | | | |
|---|---|---|---|
| 5,617,568 A | 4/1997 | Ault et al. | |
| 5,915,085 A * | 6/1999 | Koved | 726/1 |
| 5,926,805 A * | 7/1999 | Hurvig et al. | 707/690 |
| 6,256,031 B1 | 7/2001 | Meijer et al. | |
| 6,286,013 B1 | 9/2001 | Reynolds et al. | |
| 6,408,298 B1 | 6/2002 | Van et al. | |
| 6,513,038 B1 * | 1/2003 | Hasegawa et al. | 707/752 |
| 6,539,396 B1 * | 3/2003 | Bowman-Amuah | 707/769 |
| 6,738,828 B1 * | 5/2004 | Keats et al. | 709/245 |
| 7,149,738 B2 * | 12/2006 | Kumar et al. | 707/694 |
| 7,467,158 B2 | 12/2008 | Marinescu | |
| 7,555,483 B2 | 6/2009 | Maeda et al. | |
| 7,577,686 B1 * | 8/2009 | Larkin et al. | 1/1 |
| 7,962,918 B2 * | 6/2011 | Schaefer et al. | 719/313 |
| 8,108,389 B2 * | 1/2012 | Bobick et al. | 707/736 |
| 8,214,488 B2 * | 7/2012 | Machida | 709/224 |
| 8,290,949 B2 * | 10/2012 | Baker et al. | 707/736 |
| 8,635,618 B2 * | 1/2014 | Aggarwal et al. | 718/102 |
| 2003/0126304 A1 | 7/2003 | Wyatt | |
| 2004/0128544 A1 | 7/2004 | Hondo et al. | |

(Continued)

FOREIGN PATENT DOCUMENTS

| | | |
|---|---|---|
| WO | WO 03/014945 | 2/2003 |
| WO | WO 2005/010757 | 2/2005 |
| WO | WO 2006/017388 | 6/2006 |

OTHER PUBLICATIONS

PCT Application No. PCT/US2008/066559: International Search Report and Written Opinion of the International Searching Authority dated Dec. 12, 2008.

(Continued)

*Primary Examiner* — Kaveh Abrishamkar
*Assistant Examiner* — James J Wilcox
(74) *Attorney, Agent, or Firm* — Kate Drakos; Micky Minhas

(57) ABSTRACT

Access to resources on a computer may be provided by using a first namespace of resources and a second namespace of resources, where one or more names are common to both namespaces and those names refer to different respective instances of resources. A request is received for a first resource name from an application, where the first resource name exists in the first resource namespace and in the second resource namespace. In response to the request, whether to obtain a resource from the first namespace or from the second namespace is determined by applying one or more resource policies to the first resource namespace and to the second resource namespace.

21 Claims, 8 Drawing Sheets

(56) References Cited

U.S. PATENT DOCUMENTS

| | | | |
|---|---|---|---|
| 2005/0138553 A1* | 6/2005 | Ballard et al. | 715/530 |
| 2005/0283645 A1* | 12/2005 | Turner et al. | 714/4 |
| 2006/0036570 A1* | 2/2006 | Schaefer et al. | 707/1 |
| 2006/0242444 A1 | 10/2006 | Novik et al. | |
| 2006/0282461 A1 | 12/2006 | Marinescu | |
| 2007/0038697 A1* | 2/2007 | Zimran et al. | 709/203 |
| 2007/0061441 A1* | 3/2007 | Landis et al. | 709/224 |
| 2008/0021917 A1* | 1/2008 | Baker et al. | 707/102 |
| 2008/0052673 A1* | 2/2008 | Hass et al. | 717/120 |

OTHER PUBLICATIONS

Andreas Leicher "Analysis of Compositional Conflicts in Component-Based Systems", Berlin, Nov. 11, 2005.

Ross & Associates Environmental Consulting, Ltd. "Namespace Organization, Naming and Schema File Location", Version: 1.10, Revision Date: Jan. 12, 2006.

Hartmut Kaiser et al. "Versioning and Consistency in Replica Systems", International Symposium on Parallel and Distributed Processing and Application 2006, ISPA 2006.

Anonymous, "DasOrtliche.de—Hilfethemen", http://web.archive.org/web/20070609093841/http://www1.dasoertliche.de/?buc=&title=&page=O&context=O&veriNr=&veriName=&veriUrl=&verlServer=&la=de&cmd=cmd_nav_help&page=O&context=O&action=6, Jun. 9, 2007, XP55039943, 1-5.

European Patent Application No. EP 08 77 0709: Extended European Search Report dated Oct. 15, 2012, 10 pages.

Frey, Kevin, "Namespace Priority During Function Lookup", https://groups.google.com/group/comp.lang.c++.moderated/browse_thread/thread/39d78ee5ad6f9c87?h;=en&noredirect=true, Oct. 25, 2003, XP002684668, 1-2.

Konstantin Lindenau, "Windows 98- Zweite Ausgabe", 2000, XP55039530, ISBN: 978-3-82-725689-8, 12 pages.

* cited by examiner order of application →

| namespace | initial | policy1 | policy2 | policy3 |
|---|---|---|---|---|
| U | 0 | 16.3 | -25 | 31.3 |
| P | 0 | 16.2 | -25 | 31.2 |
| N | 0 | 16.1 | 25 | 31.1 |

340

| namespace | initial | policy2 | policy1 | policy3 |
|---|---|---|---|---|
| U | 0 | -25 | -25 | 31.3 |
| P | 0 | -25 | -25 | 31.2 |
| N | 0 | 25 | 25 | 31.1 |

342

| namespace | initial | policy3 | policy2 | policy1 |
|---|---|---|---|---|
| U | 0 | 31.3 | 31.3 | 31.3 |
| P | 0 | 31.2 | 31.2 | 31.2 |
| N | 0 | 31.1 | 31.1 | 31.1 |

FLEXIBLE NAMESPACE PRIORITIZATION

BACKGROUND

Computer applications typically access computer or system resources through an operation system. Resources might be files, libraries, system services (e.g. cut & paste, printers), registry or configuration information, and others. A virtualization environment or component virtualizes an application's access to system resources, transparently handling the application's access to system resources as though the application were dealing directly with the operating system.

A virtualization environment can manage access to multiple sets of system resources, some of which may overlap or conflict. A native operating system might have a set of file resources including a file with a filename such as "/somepath/someFileName". An application virtualization package (or a set of shadow resources) might have a different file instance that uses the same filename; for example, "/path/someFileName". The virtualization environment will manage an application's access to "/path/someFileName" in a manner that is transparent to the application. The application might write to "/path/someFileName", and the virtualization environment will determine which instance of the file "/path/someFileName" will be the written to; the native operating system file or the virtualization package file.

Techniques related to managing access to resources are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Access to resources on a computer may be provided by using a first namespace of resources and a second namespace of resources, where one or more names are common to both namespaces and those names refer to different respective instances of resources. A request is received for a first resource name from an application, where the first resource name exists in the first resource namespace and in the second resource namespace. In response to the request, whether to obtain a resource from the first namespace or from the second namespace is determined by applying one or more resource policies to the first resource namespace and to the second resource namespace.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 8 shows policies of FIG. 7 applied in different sequences.

DETAILED DESCRIPTION

Overview

Embodiments discussed below relate to managing virtual access to resources on a computing system. A virtual environment is discussed first. A general technique for flexibly prioritizing namespaces used in a virtual environment is then explained. Detailed features and embodiments for prioritizing namespaces are then described.

Virtual Environment

Figure 1:
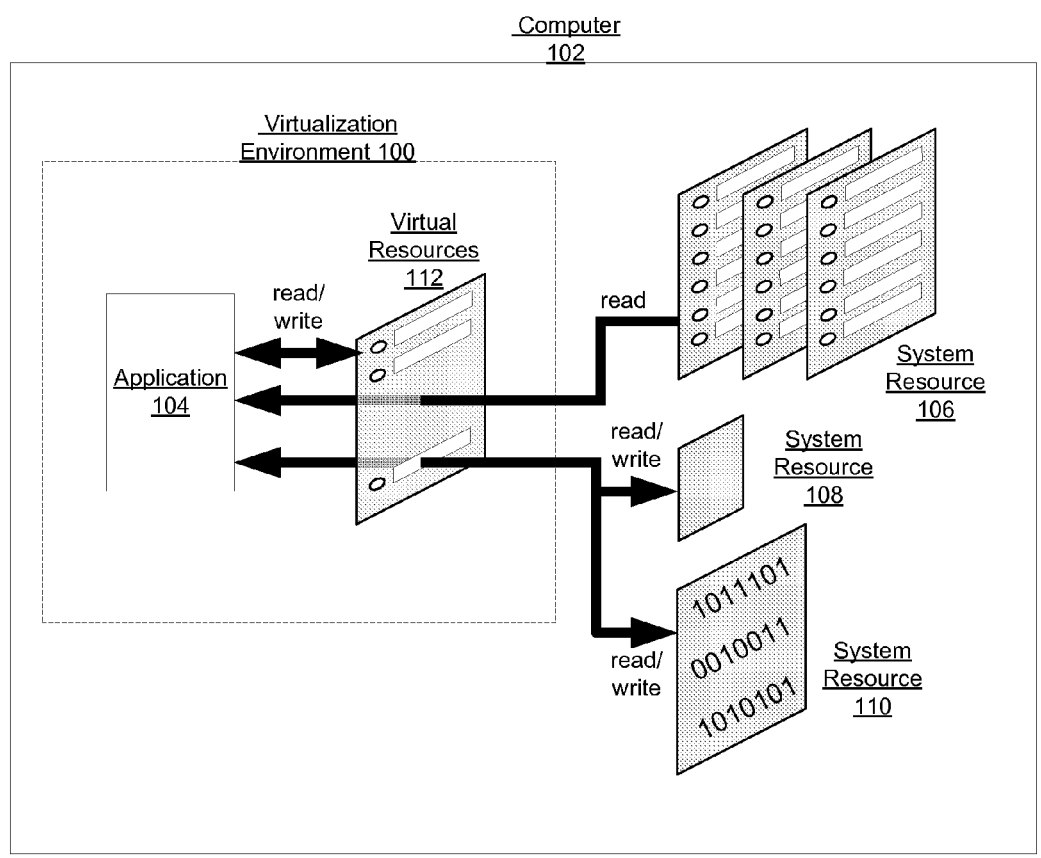
FIG. 1 shows a virtualization environment on a computer.

FIG. 1 shows a virtualization environment 100 on a computer 102. An application 104 running on the computer 102 accesses various system resources 106, 108, and 110 through the virtualization environment 100. The virtualization environment 100 manages the application's 104 access to the system resources 106, 108, 110. The system resources 106, 108, and 110 can be any type of resource available on a computer. For example, system resources 106 could be system files, registry or database entries, initialization or configuration files, dynamically loaded libraries, etc. System resources 108 could be system services such as an object communication service, printing services, cut & paste services, etc. System resources 110 could be profile data, TCP/IP addresses and/or ports, mutexes, semaphores, named pipes, COM objects, object brokers, fonts, etc.

The system resources 106, 108, and 110 may have different scope of visibility on the computer 102. Some resources 106, 108, 110 may be global native resources visible to all applications on the computer 102. Some system resources 106, 108, and 110 might be local resources visible or accessible only to the application 104. For example, an application virtualization package might include instances of files, registry entries, configuration settings, or other resources that only the application 104 uses. There might also be other semi-local resources that are available only to a certain user or to applications that are using the virtualization environment 100. Notably, any of these local or semi-local resources might have corresponding native resource instances (i.e., global resources on computer 102) having the same name. That is, as alluded to in the Background, given a resource name, there might be: an instance of a global resource with that name, an instance of a local resource with that name, and/or an instance of a semi-local resource with that same name. Techniques for flexibly controlling how such namespace conflicts are handled are discussed in detail later.

The virtualization environment 100 may cause the resources 106, 108, and 110 to appear as one set of virtual resources 112. While the application 104 may execute read and/or write operations as though directly accessing system resources 106, 108, and 110, the virtualization environment 100 intermediates those operations. Generally the application 104 will not operate any differently than it would if the virtualization environment 100 were not present on the computer 102. However, embodiments discussed below for managing namespaces of resources (such as system resources 106, 108, and 110) will be applicable regardless of whether an application changes its behavior in the presence of a virtualization environment.

Figure 2:
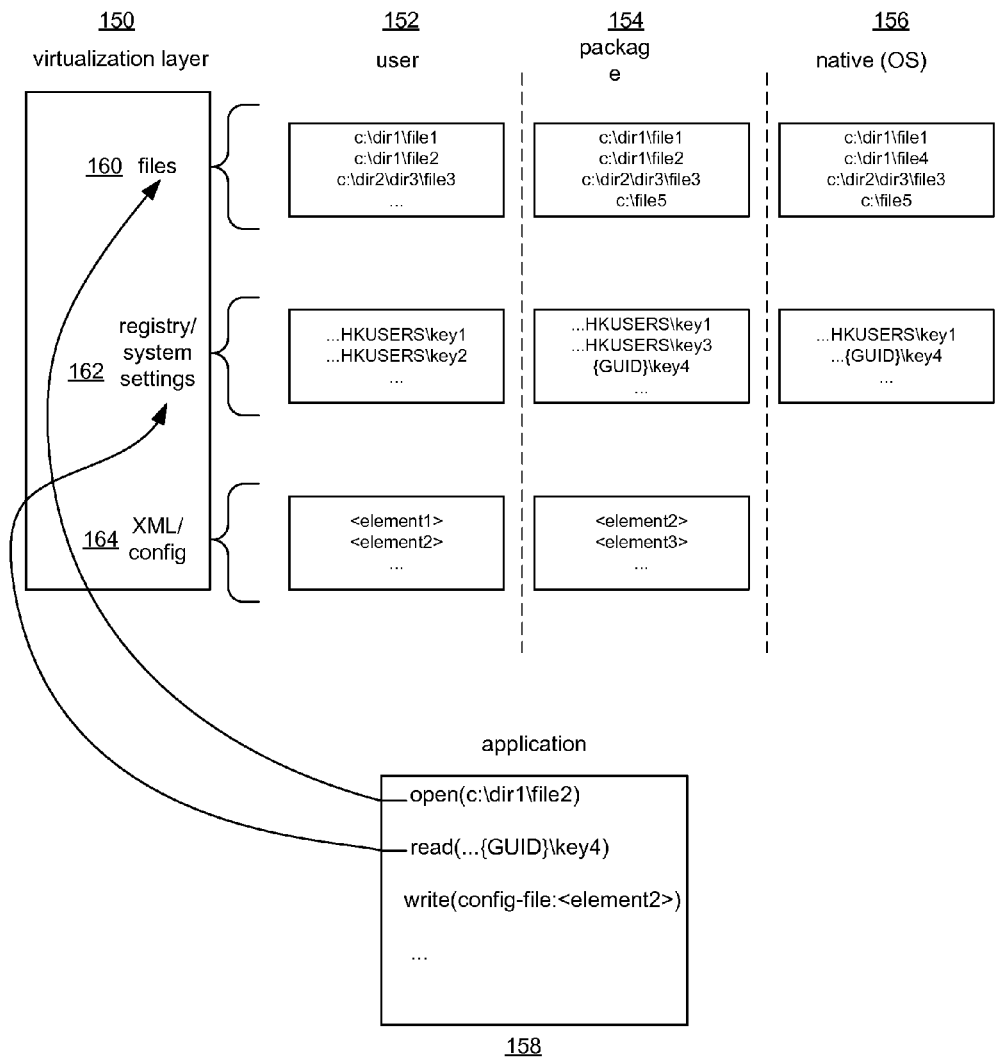
FIG. 2 shows a virtualization layer managing access to multiple sets of overlapping resources.

FIG. 2 shows a virtualization layer 150 managing access to multiple overlapping sets of resources 152, 154, and 156. An application 158 transparently accesses the resources 152, 154, and 156 through the virtualization layer 150. Under different circumstances the sets of resources 152, 154, and 156 can have different precedence and purpose. The user set 152 is scoped only to the application 158, the package set 154 is scoped to applications being run by a same user under the virtualization layer 150, and the global set 156 has global scope; any application or user identity on the host computer can potentially access the resource set 156. Other types of resources may be used. In another embodiment, set 152 could be for all applications running in the virtual environment and set 154 could be for all virtual environments across all users that are running an application. Although the sets of resources 152, 154, and 156 are shown divided into categories 160, 162, and 164 by type, this may not be necessary, depending on how resources are accessed on a particular computing platform. In one embodiment, a set of resources 152, 154, or 156 will be a container containing all types of resources with the same scope, e.g., global files, registry entries, network connections, or local files and system services, etc.

The sets of resources 152, 154, and 156 can overlap in that, as discussed above, one set of resources may have a resource instance with a same name as another resource instance in another set. In the example of FIG. 2, an instance of resource "c:\dir\file1" is in each of the sets of resources. The instances have different content, different size, etc. Another resource, such as "c:\dir1\file4", is only in the global resource set 156. The virtualization layer 150 handles the application's 158 request to open the file named "c:\dir1\file2".

It is possible for the virtualization layer 150 to fix priorities of the sets of user resources 152, 154, and 156. For example, the virtualization layer 150 may perhaps give priority to the set of user resources 152 and open the instance of "c:\dir1\file2" in the set of resources 152 and return a corresponding file handle or file object to the application 158, thus causing the application 158 to use the instance in the user set of resources 152. When the application accesses the file named "c:\dir1\file4", the resource is obtained from resource set 154, the only set that has the resource. Although this approach of static prioritization can be useful, it has limitations. As will be discussed presently, the virtualization environment 150 can be enhanced to allow resource namespaces to take on priorities that change under different conditions or contexts.

Flexible Namespace Prioritization

Figure 3:
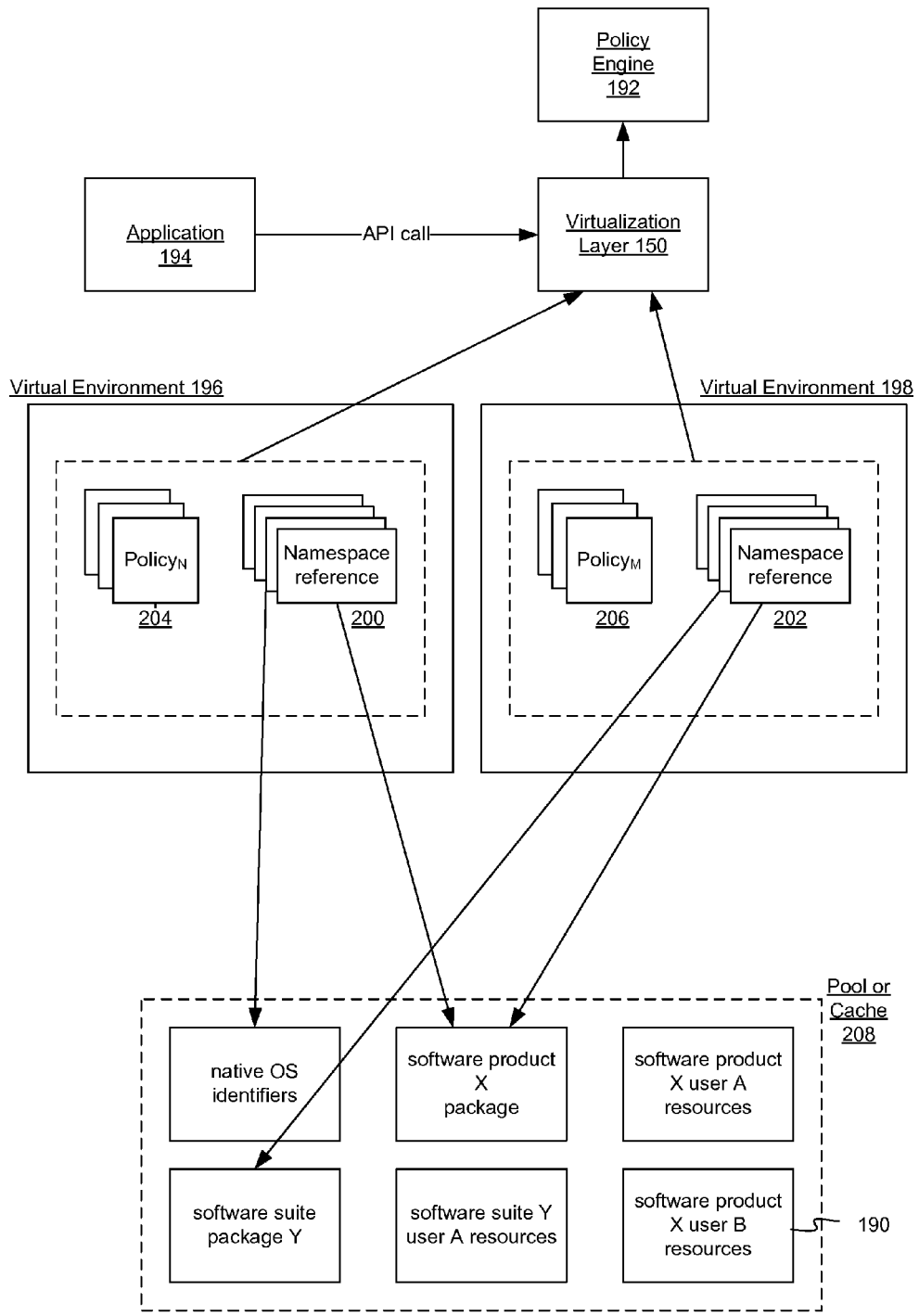
FIG. 3 shows an arrangement for flexibly prioritizing resource namespaces.

FIG. 3 shows an arrangement for flexibly prioritizing resource namespaces. In this arrangement, the virtualization layer 150 is provided with a policy engine 192. The policy engine 192 may be a software component that flexibly prioritizes resource namespaces 190. Although the policy engine 192 and virtualization layer 150 are shown as separate components, this division of function is for convenience and other structural arrangements are possible. Nonetheless, in most cases the policy engine 192 will not be visible to application 194, which operates without regard for the existence of the virtualization layer 150.

Also seen in FIG. 3 are different virtual environments 196, 198. The virtualization layer 150 is capable of running applications in different virtual environments that operate in isolation to avoid or minimize resource conflicts, to prevent interference between applications, to allow execution of different instances of a same application, etc. For example, the virtual environment 196 might be for Adobe software and the virtual environment 198 might be for Microsoft Office applications. Accordingly, virtual environments 196, 198 may have their own resource namespaces 200, 202, and policies 204, 206, respectively, for prioritizing the resource namespaces 200, 202.

As discussed later, the policies 204, 206 comprise information that can be used by the policy engine 192 to prioritize arbitrary sets of resource namespaces (e.g., resource namespaces 200, 202) in different orders for different resources that are needed by application 194. As indicated by arrows from namespaces 200, 202, the resource namespaces 200, 202 may be references to actual resource namespaces stored in a pool or cache 208 of resource namespaces managed by the virtualization layer 150, thus allowing some resource namespaces (e.g., resource namespaces 200, 202) to be conveniently passed to policy engine 192 and also, when necessary, shared between virtual environments (e.g., virtual environments 196, 198), etc. Throughout this description, "namespace" will be used to refer to both containers containing instances of actual resources as well as references to such namespaces (e.g., pointers, globally unique identifiers, object references, etc.) by which a namespace may be accessed, passed between components, shared, and so on.

Figure 4:
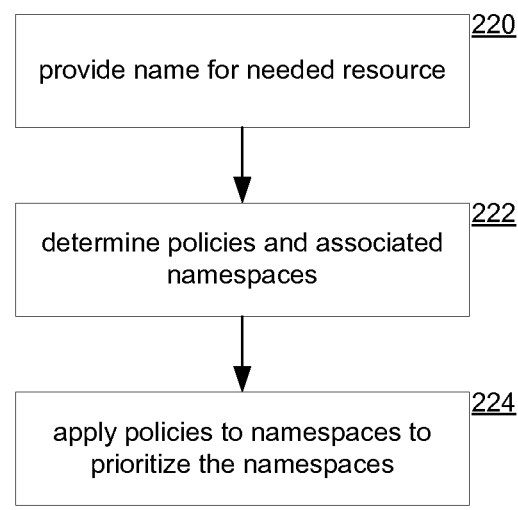
FIG. 4 shows a general process for prioritizing resource namespaces.

FIG. 4 shows a general process for prioritizing resource namespaces. It should be appreciated that the general idea of dynamically and flexibly prioritizing namespaces (e.g., reprioritizing namespaces for different resources needed by an application) can be accomplished in numerous ways and the embodiments discussed herein are only several of those ways. Initially, as mentioned earlier, an application has a name for a resource that it needs to access. Therefore, the name is provided 220 to (or intercepted by) the virtualization layer 150 (this will be transparent to the application). Next, either the virtualization layer 150 and/or a policy engine 190 determine 222 which policies (e.g., policies 204) and namespaces are potentially relevant to the requested resource. Such namespaces could be all of the policies and namespaces known to a virtual environment, as any of the namespaces may potentially supply the needed resource. Namespaces and policies can also be pre-associated so that it is known which namespace(s) a given policy is relevant to. For example, user configuration settings for the virtualization layer or environment might specify which namespaces are to be used and their default priorities. Finally, the policies are applied 224 to the determined 222 namespaces to prioritize the namespaces. As will become apparent later, if a first resource is needed by the application and it is obtained using the process of FIG. 4, and a second resource is then needed and is obtained using the process of FIG. 4, the namespaces may have different priorities for each needed resource, even if the same determined 222 policies and namespaces are used to prioritize the namespaces. Furthermore, which namespace a resource is obtained from can be flexibly changed (without having to modify the application or the virtualization layer) by modifying the relevant policies, adding new policies, or removing policies, etc.

Figure 5:
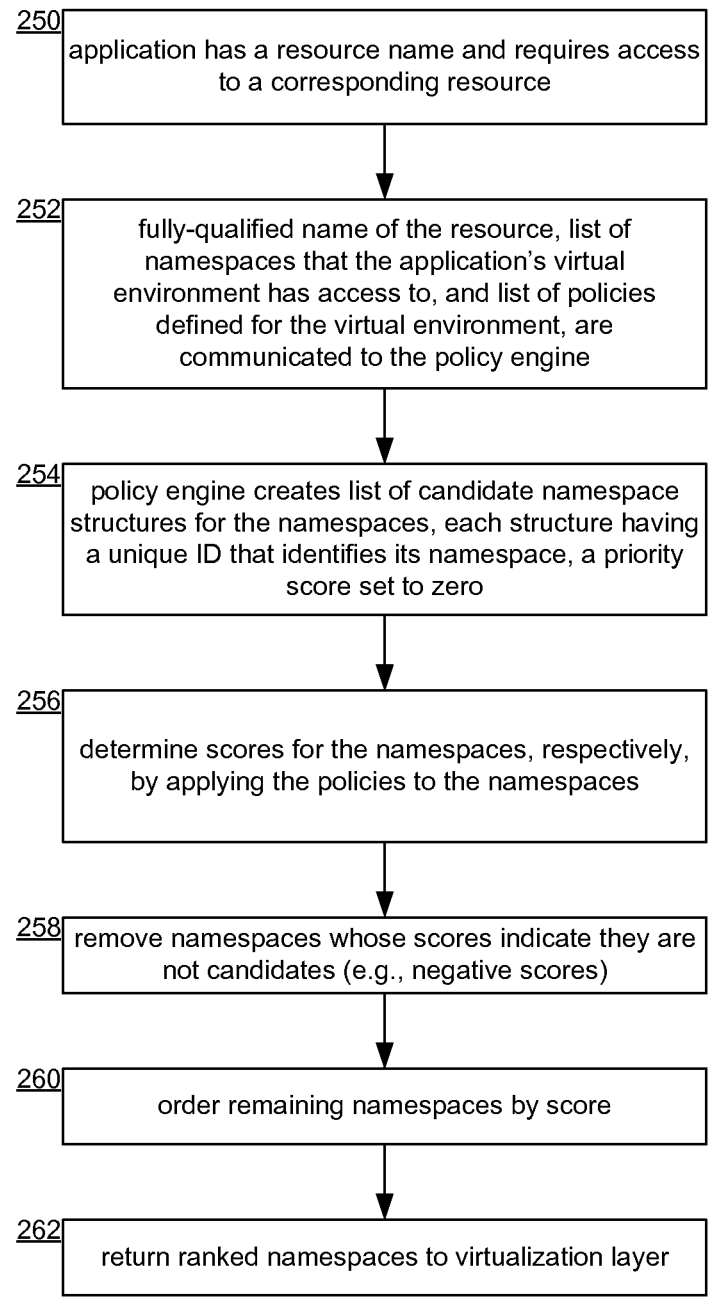
FIG. 5 shows a process for using policies to prioritize resource namespaces.

FIG. 5 shows a process for using policies to prioritize resource namespaces. It should be understood that it is possible to implement policies in different ways, and the process of FIG. 5 is just one of those ways. Initially, an application has a name of a resource (e.g., a name of a file) and requires 250 access to a corresponding resource (e.g., a file). In response perhaps to a system call (e.g., a request to open the file by its name, or some other means of requesting system resources), the virtual environment communicates 252 to the policy engine: the fully qualified name of the needed resource; a list of resource namespaces that the application's virtual environment has access to; and a list of policies defined for the virtual environment. Again, other techniques may be used. For example, a static pre-defined set of policies and namespaces may be used for each requested resource, the list of namespaces to be prioritized might be determined before a request for a resource, etc.

Figure 7:
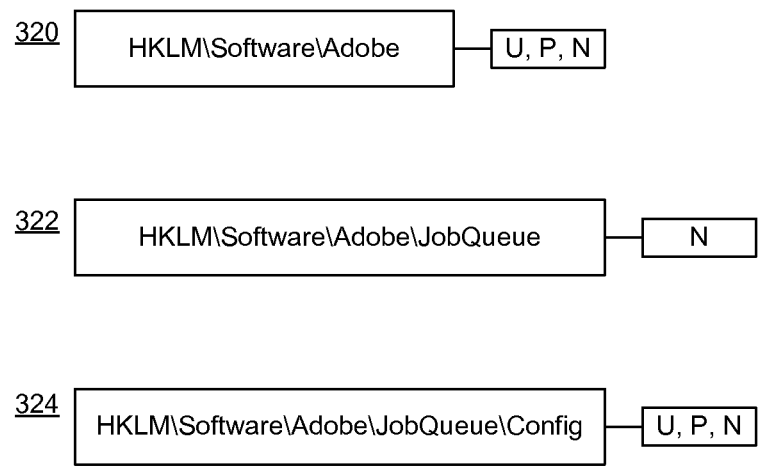
FIG. 7 shows example policies associated with resource namespaces.

The policy engine creates 254 a list of candidate namespace structures (a structures that represents a namespace) for the respective namespaces communicated 252 to the policy engine. Each structure has a unique identifier (ID) that identifies the namespace that the structure represents. The structure will also have a priority score, which is initially set to zero. Examples are shown in FIG. 7, which is discussed later. The policy engine determines 256 scores for the namespaces, respectively, using the list of structures, by applying the communicated 252 policies to the communicated 252 namespaces and storing resulting priority scores in the structures. Per the priority scores in the structures, candidate namespaces that turn out not to be candidates for providing the required 250 resource may be removed 258 from the list of structures (e.g., a namespace passed to the policy engine because it is associated with a first policy but is not associated with another policy). The remaining namespaces are ordered 260 by their priority scores and returned 262 to the virtualization layer which can then obtain from the remaining namespaces the required 250 resource, which can in turn be provided to the application in response to its initial request.

Figure 6:
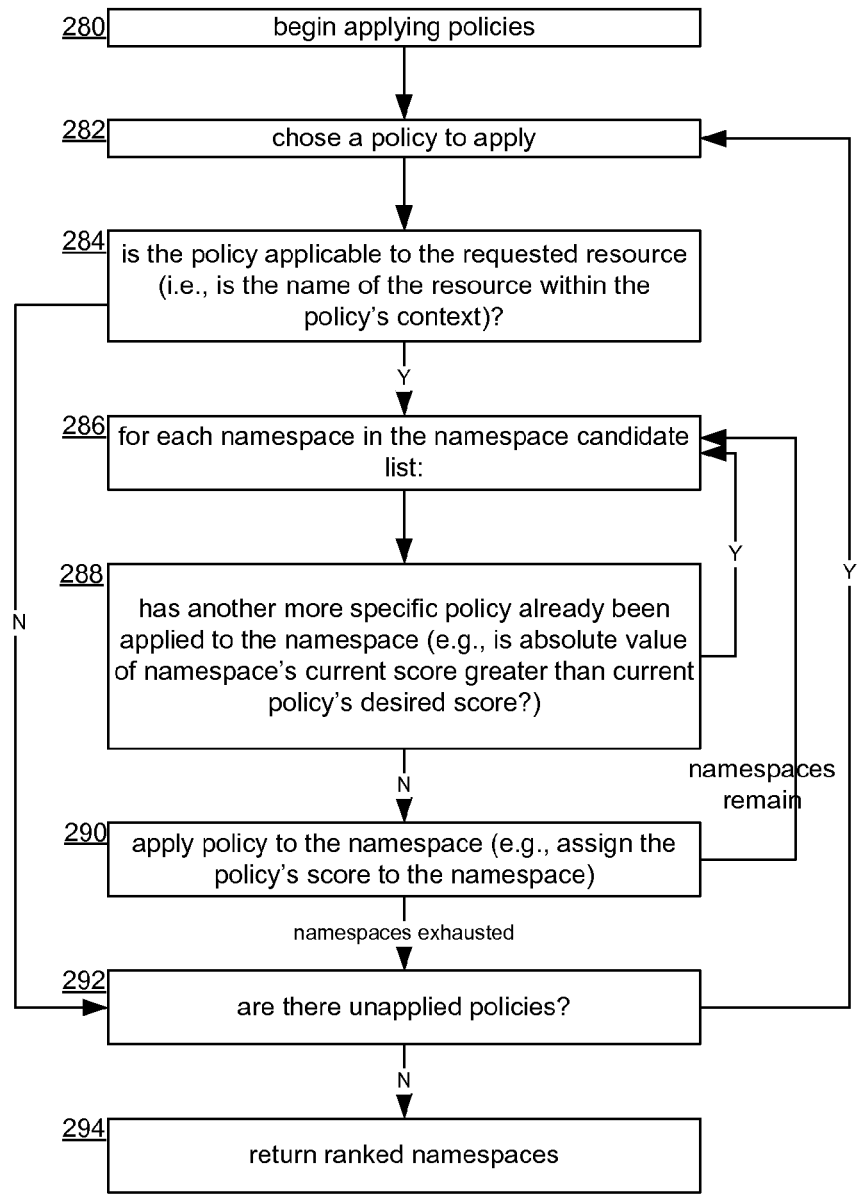
FIG. 6 shows a process for applying different policies to different resource namespaces.

FIG. 6 shows a process for applying different policies to different resource namespaces. Generally, each policy communicated 252 to the policy engine can potentially bear on the priority of each namespace communicated 252 to the policy engine. Thus, to begin 280 applying policies to namespaces, a policy that has not yet been applied is chosen 282. As will be seen, the order of applying policies should not affect the priorities calculated for the namespaces. If the policy is applicable 284 to the requested resource then for each 286 namespace in the candidate namespace list (list of namespace structures) the following steps are performed (if the policy is not applicable and there is 292 an unapplied policy, that policy is chosen 282 and processed). First, if 288 another more specific policy has already been applied to the namespace (e.g., if the absolute value of the namespace's current score is greater than current policy's desired score) then another namespace is selected 286. If not, then the current policy is applied 290 to the current namespace by, for example, assigning the policy's score to the namespace. If there are 292 unapplied policies then another policy is chosen 282 and applied accordingly. If there are not 292 unapplied policies then the ranked/prioritized namespaces are returned.

Note that whether a policy is applicable 284 to a requested namespace can be determined in many ways. For example, a policy may have some context criteria or set definition such as: it applies to all filenames ending in "doc", it applies to files in directory "\directory1\directory2", it applies to entries in a registry location, etc. Note also that although in FIG. 6 policies are iterated over in an outer loop and namespaces are iterated for each policy, because the result is not affected by the order that policies are applied, the reverse may be used; namespaces may be iterated in an outer loop, and in an inner loop policies are iterated over a current namespace.

In one embodiment, when application 194 requests a resource for a resource name (e.g., by issuing a system call such as "open(filename)"), the resource name, a set of policies, and a set of namespaces (actually, references to namespaces or globally unique identifiers of namespaces) may be passed, via the virtualization layer 150, to the policy engine 192. The policy engine 192 uses this information to prioritize the namespaces and the resource is obtained from the highest priority namespace that contains a resource for the resource name.

FIG. 7 shows example policies 320, 322, 324 associated with resource namespaces. Three hypothetical resource namespaces, called U, P, and N are available sources of resources. Policies 320 and 324 are each associated with namespaces U, P, and N. Note that the order of association (U, then P, then N) reflects the default priorities of these namespaces, U having the highest priority. Policy 322 is associated with namespace N but not P and U. The example policies 320, 322, 324 are registry locations, although they could as well be file directories or other definitions of sets of resources. For example, a policy could specify that local registry changes should go into a user's personal settings registry namespace. Another policy could be that changes to a user's profile should be made in a local filesystem namespace. Yet another example, files with names that match "*.doc" should always be accessed from a local filesystem namespace. Or, changes to network shares are to be performed using a given resource namespace. Consider some other examples.

Policies such as policies 320, 322, and 324 can either inherently specify which namespaces they apply to (as with some of the examples in the preceding paragraph), or namespaces can be freely associated with any policies. It can be assumed that when a policy is not associated with a namespace (at least when being used to prioritize particular namespaces) then that policy might directly prioritize that particular namespace. A policy can be associated with multiple namespaces, in which case those namespaces should have a default priority among themselves. A policy may also have some information that can be used to prioritize a namespace to which it applies. For example, some weighting constant can be used. A priority might also be assigned based on a degree to which a policy is applicable to a requested name, allowing policies to be applied in a way that, when two policies match a resource name, the policy with more specific context (e.g., a more specific filesystem directory, an explicit filename rather than a wildcard-specified filename, a longer registry path, a path name with a particular substring in it, etc.).

FIG. 8 shows the policies 320, 322, 324 of FIG. 7 applied in different sequences according to embodiments of FIGS. 5 and 6. A list of data structures 340 will be now be discussed in detail, and later, similar lists 342 and 344 will be discussed briefly. For this example, the weight or priority score for each policy will be determined by the length of the path that it specifies, 16, 25, and 31 for U, P, and N respectively. Other weights could as well have been used, path length happens to be a convenient measure of specificity. Weight could also be driven by factors such as the presence of a wildcard, some pre-defined criteria, etc.

Suppose that an application requires 250 a resource corresponding to the fully qualified resource name "HKLM\Software\Adobe\JobQueue\Config" (for brevity, to be referred to as "HKLM . . . Config"). Policies 320, 322, and 324 correspond to the virtual environment in which the request is made, and so those policies as well as their associated namespaces are communicated 252 to the policy engine (or some virtualization component of similar functionality). The policy engine creates 254 a candidate namespace structure for each namespace, with priority set to 0; the "namespace" and "initial" columns in list 340. The policies 320, 322, 324 are applied 280 as follows.

Policy 320 is chosen 282 first. Policy 320 is 284 applicable as the requested name "HKLM . . . Config" falls under the path (context) specified by policy 320. In other words, the requested resource name "HKLM . . . Config" matches the context of the policy 320. Therefore, for each namespace U, P, and N in the candidate list 340, the following occurs. Namespace U is applied 290 because the absolute value of the current score (0) for U is less than the policy 320's intended score (16.3). Note that the "0.3" is added to represent the fact that, for policy 320, U has the default highest priority among the namespaces U, P, and N. Similarly, "0.2" and "0.1" are to be added to the weights of P and N, respectively. Policy 320 is then applied to P and N, and they are given scores of 16.2 and 16.1, respectively. There are 292 unapplied policies, 322, 324. Policy 322 is chosen 282. It has a greater priority weight than the scores in list 340 and therefore it scores the namespaces with −25, −25 and 25. The negative scores for namespaces U and P are given because policy 322 is not associated with those namespaces. Finally, the last policy 324 is applied 290 to each namespace because its weight or score, 31, is greater than the absolute values of the preceding scores. The final scores for the namespaces are 31.3, 31.2, and 31.1, which indicates that, when a resource for "HKLM . . . Config" is obtained from the namespaces, namespaces U, P and N will be used in that order until a resource corresponding to "HKLM . . . Config" is found in one of the namespaces.

Namespace lists 342 and 344 show how scores will be assigned when policies 320, 322, 324 are applied in different orders. List 342 would result if the order were: policy 322, 320, then 324. List 344 would result if the order were: policy 324, 322, then 320. In each case the final scores for the namespaces are the same.

In accordance with some of the embodiments discussed above, resources can be obtained from multiple overlapping namespaces and conflicts can be resolved in a flexible and predictable manner by specifying general (or even specific) circumstances under which different namespaces take precedence (e.g., by using policies). A same policy engine can cooperate with a same virtualization layer to prioritize different namespaces with different policies for different virtual environments being handled by the virtualization layer. Furthermore, in some embodiments policies can be applied to namespaces in any order with deterministic results.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. A computer implemented method for resolving conflicts between concurrent resource namespaces, the method comprising:

updating policies comprising conditions under which one or more of the concurrent resource namespaces are applicable, the concurrent resource namespaces comprising a plurality of names corresponding to resources, the concurrent resource namespaces at least partially overlapping such that a same name in two or more resource namespaces refers to different instances of resources in respective resource namespaces;

receiving a request for a resource, the request including a resource name associated with a resource context, wherein the resource name exists in a plurality of the concurrent resource namespaces;

selecting which of the updated policies and which of the resource namespaces are relevant to the request for the resource;

based at least in part on the selected updated policies and resource contexts of the selected updated policies, prioritizing the concurrent resource namespaces relative to one another; and selecting, by the computer, a resource associated with the resource name based on the prioritized resource namespaces.

2. A method according to claim 1, wherein a resource namespace is not prioritized if the resource namespace is not associated with at least one of the selected updated policies.

3. A method according to claim 1, wherein prioritizing the concurrent resource namespaces further comprises weighting the concurrent resource namespaces in proportion to degrees to which the resource name matches the selected updated policies.

4. A method according to claim 1, wherein the resource namespaces have default relative priorities and when the resource name matches selected policies for one of the resource namespaces, a resource corresponding to a matching resource name is obtained according to the default relative priorities.

5. A method according to claim 1, wherein the policies comprise information describing an open ended set of resource names which arbitrary resource names can be compared against to determine whether such arbitrary resource names fall within the open ended set.

6. A method according to claim 5, wherein the policies comprise a file directory or registry location.

7. A method according to claim 1, wherein the concurrent resource namespaces are prioritized by matching a context of the resource name with a policy context of the selected updated policies.

8. A system for resolving conflicts between concurrent resource namespaces, the system comprising:

a computing device comprising at least one processor;

a memory communicatively coupled to said processor when said system is operational;

said memory having stored therein computer instructions that upon execution by the at least one processor cause:

updating policies comprising conditions under which one or more of the concurrent resource namespaces are applicable, the concurrent resource namespaces comprising a plurality of names corresponding to resources, the concurrent resource namespaces at least partially overlapping such that a same name in two or more resource namespaces refers to different instances of resources in respective resource namespaces;

receiving a request for a resource, the request including a resource name associated with a resource context, wherein the resource name exists in a plurality of the concurrent resource namespaces;

selecting which of the updated policies and which of the resource namespaces are relevant to the request for the resource;

based at least in part on the selected updated policies and resource contexts of the selected updated policies, prioritizing the concurrent resource namespaces relative to one another; and selecting a resource associated with the resource name based on the prioritized resource namespaces.

9. A system according to claim 8, wherein a resource namespace is not prioritized if the resource namespace is not associated with at least one of the selected updated policies.

10. A system according to claim 8, wherein prioritizing the concurrent resource namespaces further comprises weighting the concurrent resource namespaces in proportion to degrees to which the resource name matches the selected updated policies.

11. A system according to claim 8, wherein the resource namespaces have default relative priorities and when the resource name matches selected policies for one of the resource namespaces, a resource corresponding to a matching resource name is obtained according to the default relative priorities.

12. A system according to claim 8, wherein the policies comprise information describing an open ended set of resource names which arbitrary resource names can be compared against to determine whether such arbitrary resource names fall within the open ended set.

13. A system according to claim 12, wherein the policies a file directory or registry location.

14. A system according to claim 8, wherein the concurrent resource namespaces are prioritized by matching a context of the resource name with a policy context of the selected updated policies.

15. A computer readable storage device storing thereon computer executable instructions for resolving conflicts between concurrent resource namespaces, the computer readable storage device comprising:

instructions for updating policies comprising conditions under which one or more of the concurrent resource namespaces are applicable, the concurrent resource namespaces comprising a plurality of names corresponding to resources, the concurrent resource namespaces at least partially overlapping such that a same name in two or more resource namespaces refers to different instances of resources in respective resource namespaces;

instructions for receiving a request for a resource, the request including a resource name associated with a resource context, wherein the resource name exists in a plurality of the concurrent resource namespaces;

instructions for selecting which of the updated policies and which of the resource namespaces are relevant to the request for the resource;

instructions for, based at least in part on the selected updated policies and resource contexts of the selected updated policies, prioritizing the concurrent resource namespaces relative to one another; and selecting, by the computer, a resource associated with the resource name based on the prioritized resource namespaces.

16. A computer readable storage device according to claim 15, wherein a resource namespace is not prioritized if the resource namespace is not associated with at least one of the selected updated policies.

17. A computer readable storage device according to claim 15, wherein prioritizing the concurrent resource namespaces further comprises weighting the concurrent resource namespaces in proportion to degrees to which the resource name matches the selected updated policies.

18. A computer readable storage device according to claim 15, wherein the resource namespaces have default relative priorities and when the resource name matches selected policies for one of the resource namespaces, a resource corresponding to a matching resource name is obtained according to the default relative priorities.

19. A computer readable storage device according to claim 15, wherein the policies comprise information describing an open ended set of resource names which arbitrary resource names can be compared against to determine whether such arbitrary resource names fall within the open ended set.

20. A computer readable storage device according to claim 19, wherein the policies a file directory or registry location.

21. A computer readable storage device according to claim 15, wherein the concurrent resource namespaces are prioritized by matching a context of the resource name with a policy context of the selected updated policies.

* * * * *